Feb. 14, 1967 — J. H. AUER, JR — 3,304,539
FREEWAY ACCESS RAMP TRAFFIC CONTROL
Original Filed July 5, 1962 — 9 Sheets-Sheet 4

FIG. 4A.

INVENTOR.
J. H. AUER JR.
BY
HIS ATTORNEY

Feb. 14, 1967 J. H. AUER, JR 3,304,539
FREEWAY ACCESS RAMP TRAFFIC CONTROL
Original Filed July 5, 1962 9 Sheets-Sheet 7

FIG. 4D.

RAMP CLOSED SIGNS

*INVENTOR.*
J. H. AUER JR.
BY
HIS ATTORNEY

INVENTOR.
J.H. AUER JR.
BY
Forest B. Hitchcock
HIS ATTORNEY

United States Patent Office 3,304,539
Patented Feb. 14, 1967

3,304,539
FREEWAY ACCESS RAMP TRAFFIC CONTROL
John H. Auer, Jr., Fairport, N.Y., assignor to General Signal Corporation, a corporation of New York
Continuation of abandoned application Ser. No. 207,537, July 5, 1962. This application Oct. 15, 1965, Ser. No. 505,103
16 Claims. (Cl. 340—36)

This application is a continuation of my prior application Ser. No. 207,537, filed July 5, 1962, now abandoned.

This invention relates to traffic signaling systems and more particularly to a system for controlling traffic entering a freeway from an access ramp in accordance with traffic conditions.

Modern high-speed freeways require free flow of traffic in order to avoid congestion resulting ultimately in traffic stoppages. Under heavy traffic conditions, entry of vehicles onto a freeway without limitation may ultimately result in stoppages. Under light traffic conditions however, it is desirable to permit vehicular entry onto the freeway without limitation. Under traffic conditions ranging between light and heavy, it is desirable to limit access to the freeway in a graduated manner; that is, as freeway traffic increases from light to heavy, increasing limitation on vehicular entry onto the freeway is desirable. However, restriction of vehicular access to the freeway will result in congestion on freeway access ramps. Therefore it is also desirable to close any access ramp which becomes completely filled with vehicles waiting to enter the freeway during heavy freeway traffic conditions in order to avoid congestion on surface streets leading to the access ramps.

Systems for vehicle-actuated traffic signals are well known. Such systems involve means for operating the signal light immediately or within a predetermined time after the vehicle has actuated a detector. Systems for operating traffic signals in accordance with predetermined timing cycles are also well known. However, until now there has not been a system for automatically selecting one of a plurality of timing cycles for a traffic signal controlling access to a freeway in accordance with freeway traffic conditions ranging from 100% green signal under light traffic conditions to 100% red signal and prohibited entry onto access ramps under heavy traffic conditions. Accordingly, one object of this invention is to provide a method and apparatus for automatically selecting a timing cycle for a traffic signal in accordance with traffic conditions.

Another object of this invention is to provide a method and apparatus for automatically regulating entry to a freeway from an access ramp in accordance with freeway lane occupancy.

Another object of this invention is to provide a method and apparatus for prohibiting entry to a freeway access ramp when the ramp becomes filled with vehicles waiting to enter the freeway.

Another object of this invention is to provide a method and apparatus for automatically regulating access to a freeway from a ramp in accordance with regularity of spacing between vehicles on the freeway.

Other objects, purposes and characteristic features of the present invention will be in part obvious from the accompanying drawings, and in part pointed out as description of the invention progresses.

The invention contemplates a vehicle detector situated to sense a traffic parameter on a freeway lane, a vehicle presence detector situated to sense a freeway entrance ramp outlet occupancy, a vehicle presence detector situated to sense ramp inlet occupancy, and means connecting the detectors to a traffic signal for varying the proportion of red signal to green signal in accordance with traffic conditions as sensed by the vehicle detectors.

To simplify the illustration, the parts and circuits constituting the various embodiments of the invention are shown diagrammatically and certain conventional circuits and elements are illustrated in block form. The symbols (B+) and (B—) respectively represent positive and negative terminals of a voltage source, with the symbol for ground connection indicating an intermediate tap between the positive and negative terminals. The symbols (+) and (—) represent positive and negative terminals of other voltage sources.

In describing the invention in detail, reference will be made to the accompanying drawings, in which like reference characters designate corresponding parts throughout the several views, and in which.

Figure 1:
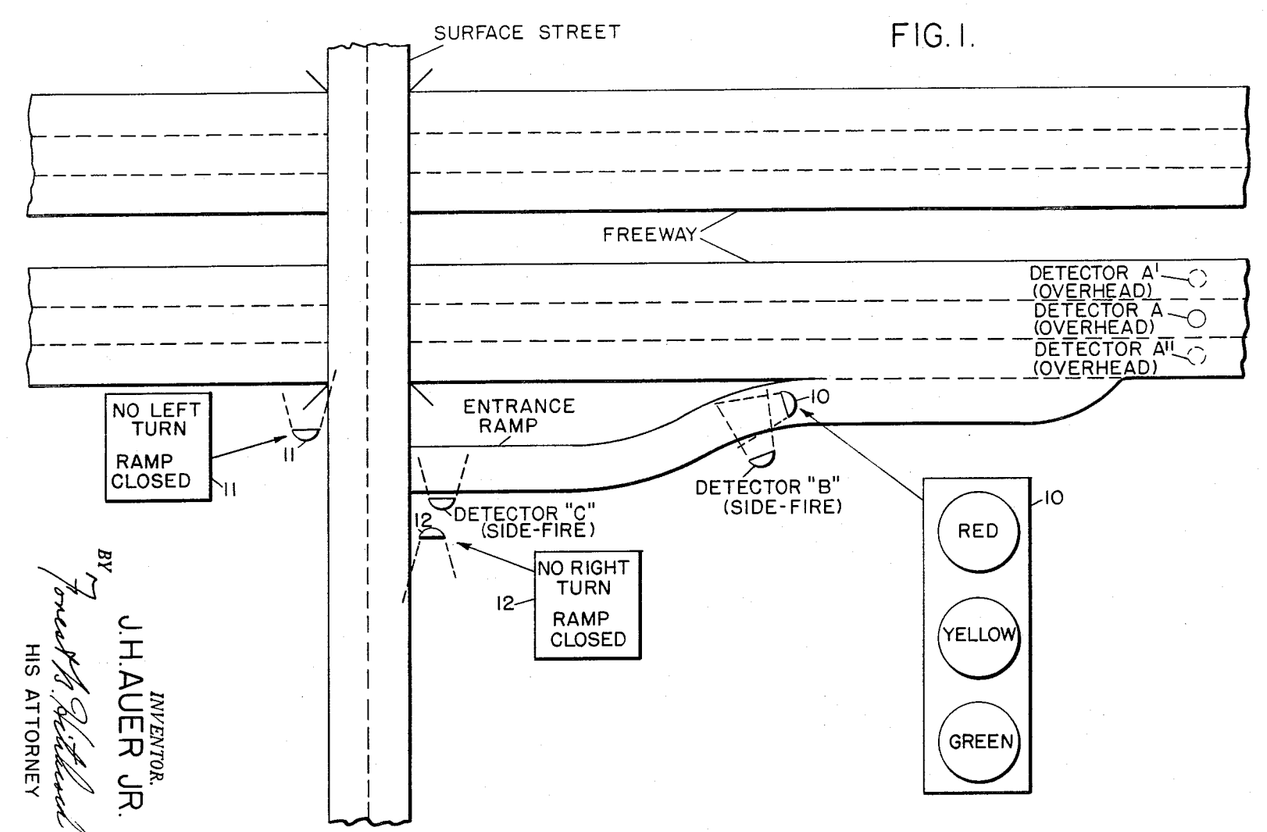
FIG. 1 represents a typical ramp leading from a surface street to a freeway where a traffic control system embodying the present invention is installed.

Referring first to FIG. 1, a ramp is shown leading from a surface street to a freeway. Three vehicle detectors are utilized. A first detector A, located above one of the freeway lanes in the region of the freeway to which traffic from this particular ramp will feed, is, in one embodiment of this scheme, an accurate presence detector by which traffic conditions on this portion of the freeway are ascertained through lane occupancy measurement of the center lane. Lane occupancy may be defined as the percentage of a lane occupied by vehicles. Due to a natural tendency of traffic to distribute itself under conditions of moderate to heavy flow, sampling of one lane, as shown by location of detector A, provides a fairly accurate indication of the condition of all lanes. For greater accuracy, a plurality of detectors may be used, one above each freeway lane, as indicated by detector A and detectors A' and A", shown dotted. For accurate determination of lane occupancy, these detectors should be pavement seeking units.

A second presence detector B is located at the foot of the ramp and a third presence detector C is located at the top of the ramp. Detectors B and C are shown as side-fire detectors although overhead units can also be used. Examples of detectors which may be used with this system are disclosed in the pending application of Kendall et al., Ser. No. 808,736, filed April 24, 1959, now Patent No. 3,042,303, issued July 3, 1962, and in Patent No. 3,030,608, issued to Morton A. Polster on April 17, 1962.

Three signals are shown in FIG. 1. A standard three color signal face 10 is located at the foot of the entrance ramp, while a pair of signs 11 and 12 are located on the surface street and serve to close the entrance to the ramp. Basic system operation is as follows:

The signal 10 at the foot of the ramp controls traffic passing from the ramp to the freeway, in a gradual manner. Thus, this signal might be operated on a 60 second cycle for example, so that relation between freeway lane occupancy and signal green time during each 60 second cycle could be as follows:

| Lane occupancy: | Green time, seconds |
|---|---|
| 0–15% | 60 |
| 15–20% | 45 |
| 20–25% | 30 |
| 25–30% | 15 |
| above 30% | 0 |

Thus, signal split is controlled as a function of lane occupancy so that at occupancies below 15%, the signal is always green, or go, at occupancies above 30% the signal is always red, or stop, and at occupancies between 15 and 30% the signal operates cyclically to gradually throttle entering traffic. The signal acts as a valve having a plurality of positions, shown herein as five, varying from full on to full off. The lengths of green interval and red interval of every position are different from the lengths of their respective intervals in every other position. Therefore, as congestion increases, flow of traffic from the ramp to the freeway is gradually restricted to help prevent the freeway from reaching breakdown.

When the signal is red, the ramp serves as a temporary storage area to hold vehicles entering from the surface street. If during a red phase the ramp fills to capacity, detector C is actuated, in turn actuating a circuit that senses steady occupancy of longer than a predetermined duration. Thus, the system might be adjusted to indicate steady occupancy of detector C for more than 10 seconds. When such indication occurs, the system will energize the two "Ramp Closed" signs 11 and 12 thereby prohibiting additional traffic from entering the ramp.

When freeway lane occupancy reaches 30% (or any other level at which the red signal condition is set to occur), the two signs again energize to prevent additional traffic from entering the ramp.

Once signs 11 and 12 energize, they will remain energized until both the following conditions are met:

(1) Detector B must be steadily unactuated for a specified time interval, for example 10 seconds, indicating that the ramp has emptied and can accept a reasonable quantity of surface street traffic.

(2) Freeway lane occupancy must be at least one step below the level at which the signal is continuously read. Using the above example, lane occupancy must be below 25%. This assures that the ramp will not be closed quickly after it is opened.

To prevent vehicles from becoming trapped on the ramp, the signal is prevented from going to a steady red phase whenever detector B is actuated. Thus, in the above example, as freeway lane occupancy exceeds 30%, the signs will energize closing the ramp entrance. The signal will however continue to provide 15 seconds of green for each 60 second interval until the ramp empties. At that time, the signal will become steady red and the signs will remain energized until freeway lane occupancy falls below 25%. Signal 10 is maintained at steady red until freeway lane occupancy falls below 25% in order to avoid having an illuminated sign indicating a closed ramp during the time a green signal is displayed at the bottom of an empty ramp. Such situation might prompt a motorist to violate the sign and enter the ramp.

Figure 2:
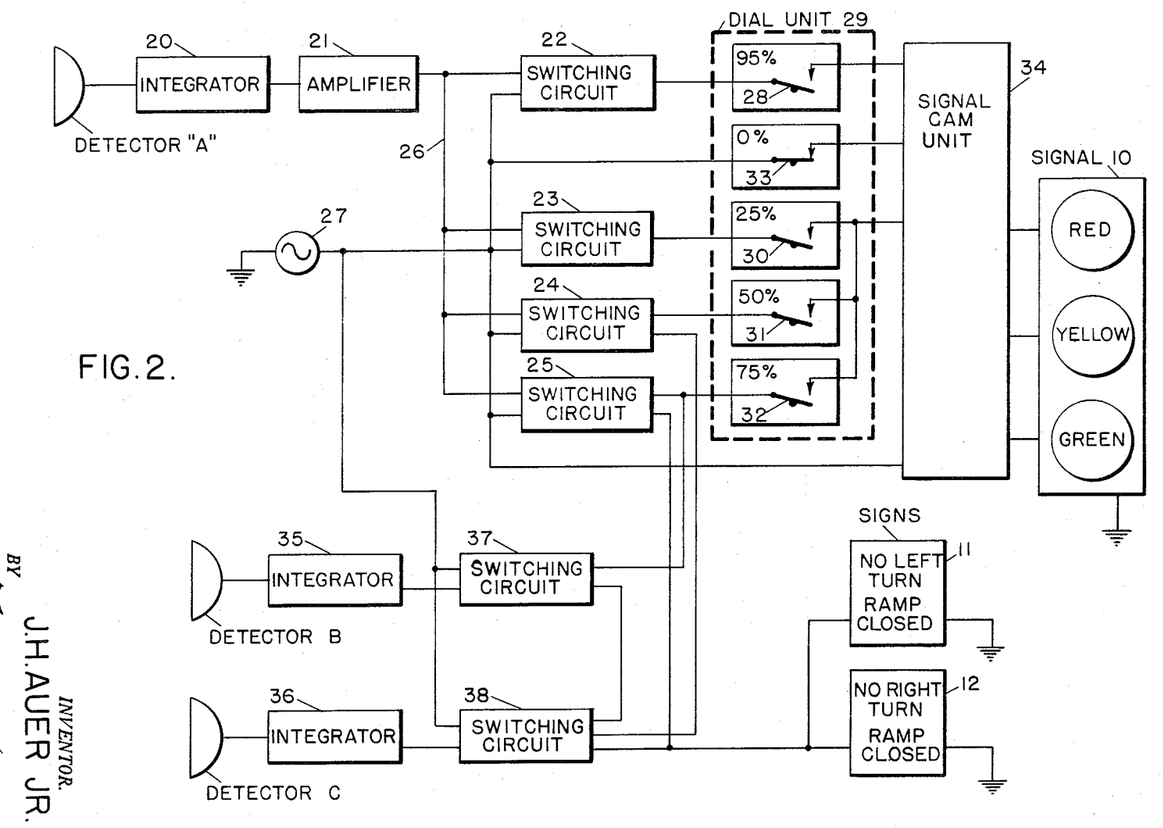
FIG. 2 is a block diagram for a typical traffic control system embodying the features of the present invention.

Referring next to FIG. 2 for a simplified explanation of the system, the signal from detector A is coupled through an integrator 20 to the input of an amplifier circuit 21, such as a cathode follower. The integrator provides a smoothly varying input signal to the cathode follower, smoothing out any sharp fluctuations in the signal produced by detector A.

Output of the amplifier is applied simultaneously to four switching circuits 22, 23, 24 and 25 through a wire 26. These switching circuits are adjusted to respond to different output voltage levels of the cathode follower. Thus, as integrated output voltage of detector A increases in amplitude, switching circuit 22 will be actuated first. As output amplitude of detector A continues to increase, switching circuit 23 will be actuated, followed by switching circuit 24 and finally switching circuit 25. Actuation of switching circuit 22 causes application of A.C. voltage from an A.C. source 27 through a switch contact 28 to one portion of a signal cam unit 34 when the contact closes. This contact is part of a continuously recycling dial unit 29, closing each time the dial unit completes 95% of its cycle. Actuation of switching circuit 23 removes A.C. voltage from a contact 30 of the dial unit. Contact 30 closes each time the dial unit completes 25% of its cycle. As output voltage amplitude of detector A increases further, switching circuit 24 is actuated, removing A.C. voltage from a contact 31 of the dial unit. Contact 31 closes each time 50% of the dial unit cycle has elapsed. As output voltage amplitude of detector A increases still further, switching circuit 25 removes A.C. voltage from a contact 32 of the dial unit. This contact closes each time 75% of the dial unit cycle has elapsed. A.C. voltage is applied from source 27 to a second portion of signal cam unit 34 through a contact 33 of the dial unit each time contact 33 closes. This occurs at the start and completion of each dial unit cycle. It should be noted that the output sides of contacts 30, 31, and 32 are connected together to a third portion of signal cam unit 34.

The dial unit contacts serve to actuate the signal cam unit for application of A.C. voltage to the proper lamp of signal 10. Thus, depending upon which switching circuits have been actuated by detector A, timing of signal 10 will be affected by the cyclical opening and closing of the activated contacts of the dial unit.

Detector B is connected to a switching circuit 37 through an integrator 35 while detector C is connected to a switching circuit 38 through an integrator 36. Output voltage amplitude of integrator 35 must reach a predetermined value in order to actuate switching circuit 37, while output voltage amplitude of integrator 36 must reach a predetermined value in order to actuate switching circuit 38. Such predetermined voltages are produced by integrator 35 when detector B has not detected a vehicle for a specified time interval, and by integrator 36 when detector C has steadily detected a vehicle for a specified time interval. If detector B detects a vehicle before the specified time interval has occurred, output voltage of integrator 35 drops to zero and switching circuit 37 remains unactuated. Likewise, if detector C does not detect a vehicle for the full specified time interval required to actuate switching circuit 38, output voltage of integrator 36 drops to zero and switching circuit 38 remains unactuated. When detector B prevents actuation of switching circuit 37, contact 32 in dial unit 29 will be activated by A.C. voltage, assuring that a red signal will occupy a maximum of 75% of every signal cycle during which a vehicle is detected by detector B.

When detector C actuates switching circuit 38, signs 11 and 12 are illuminated, closing the ramp. It should also be noted that actuation of switching circuit 25 will also serve to illuminate the signs. Furthermore, switching circuits 24 and 37 are interlocked with switching circuits 25 and 38, so that if signs 11 and 12 are illuminated by either detector C and switching circuit 38 or by detector A and switching circuit 25, and switching circuit 37 or 24 should be actuated, signs 11 and 12 will remain illuminated as long as switching circuit 37 or 24 is actuated, even if switching circuits 25 and 38 become deactivated.

Figure 3:
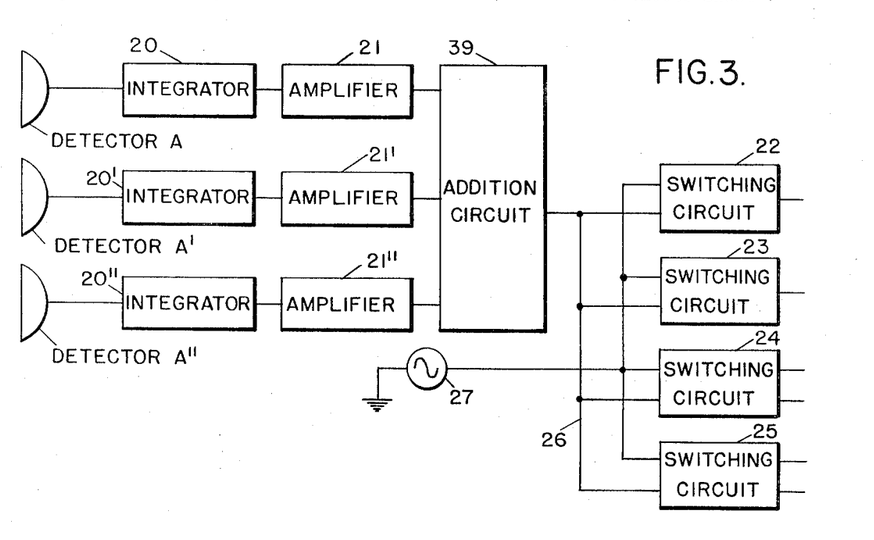
FIG. 3 is a modification of the traffic control system of FIG. 2.

FIG. 3 illustrates a modification of the circuit of FIG. 2, wherein an overhead detector is used above each freeway lane to sense lane occupancy of each freeway lane. In this case, the freeway is assumed to have three lanes. Output of each overhead detector A, A' and A" is applied to an integrator circuit 20, 20' and 20" respectively, and output of each integrator is applied to an amplifier 21, 21' and 21" respectively. Amplitudes of signals produced by the amplifier are then totaled in a conventional summation or addition circuit 39 and applied to wire 26 of the circuit. Thus the signal controlling switching circuits 22, 23, 24 and 25 is dependent upon lane occupancy of all freeway lanes, and is thereby more closely representative of total freeway traffic conditions. Operation of the remainder of the circuit is as described for FIG. 2.

Figure 4A:
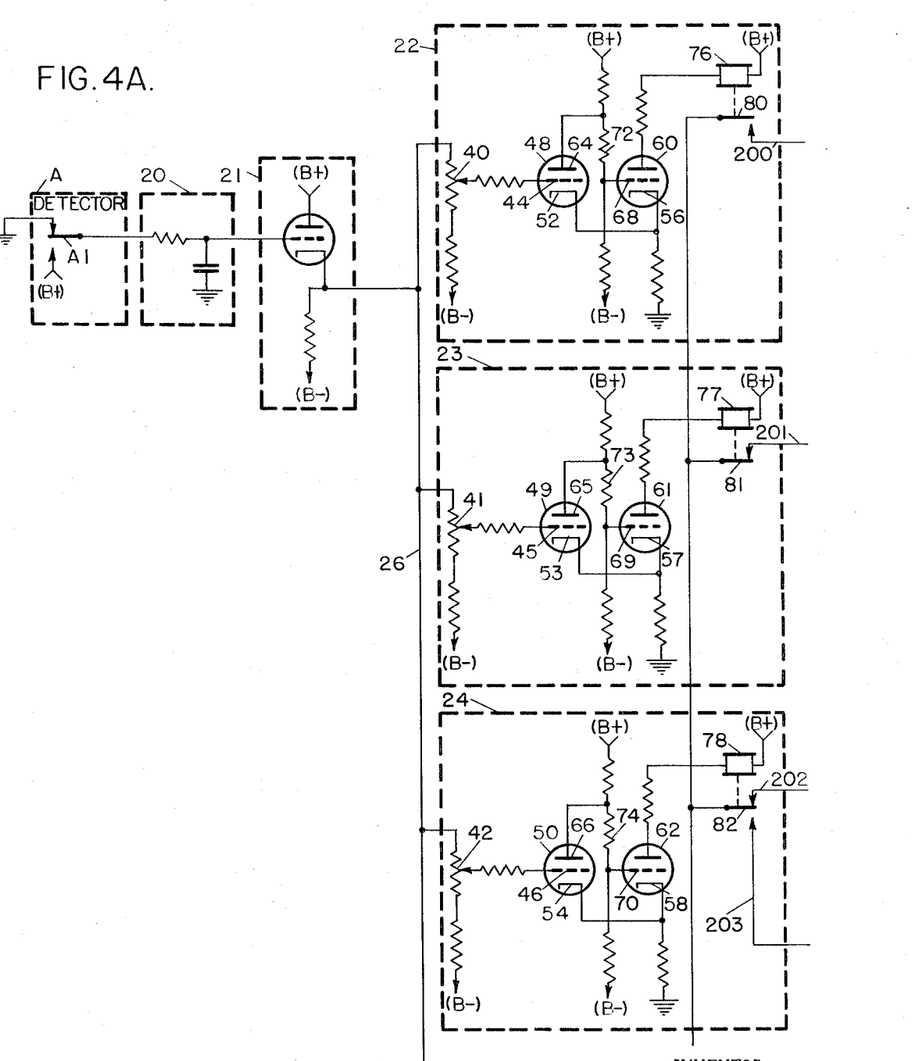
FIGS. 4A, 4B, 4C and 4D represent interconnected sections of a circuit diagram of the embodiment shown in FIG. 2.
Figure 4B:
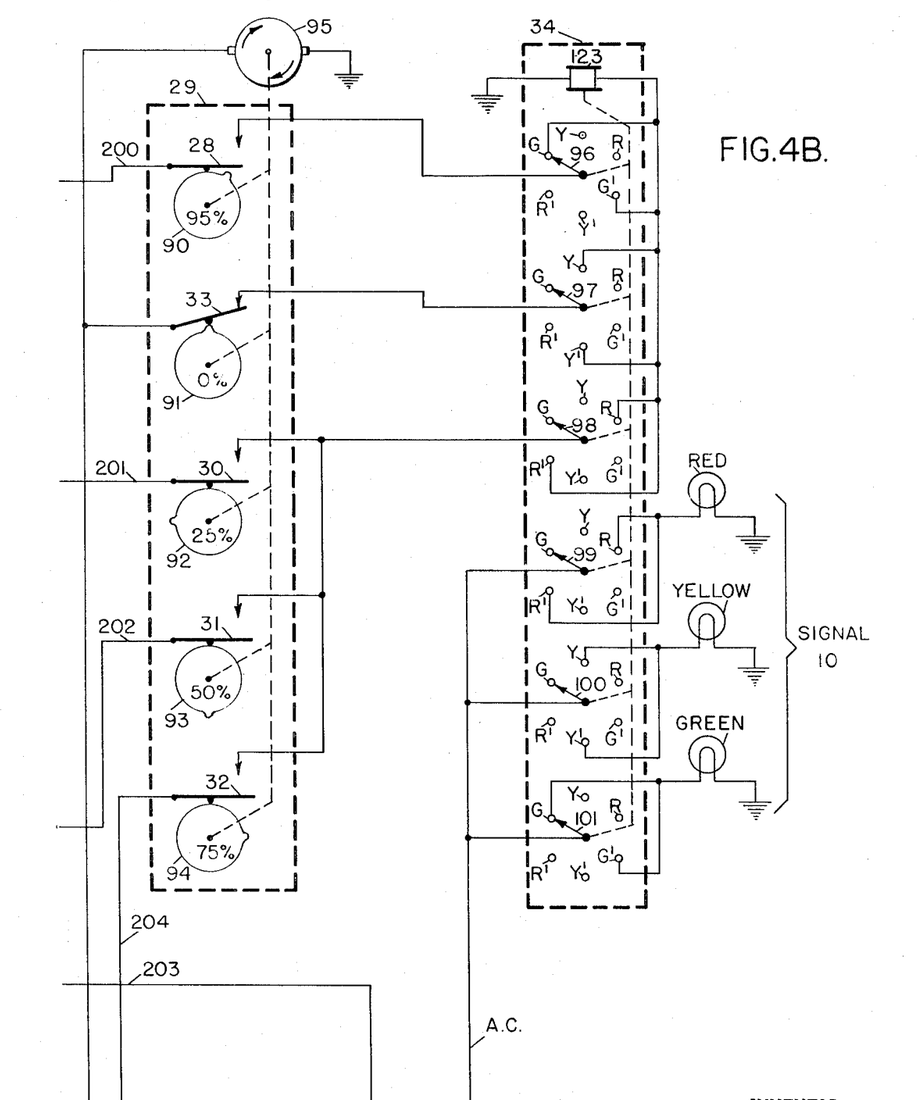
Figure 4C:
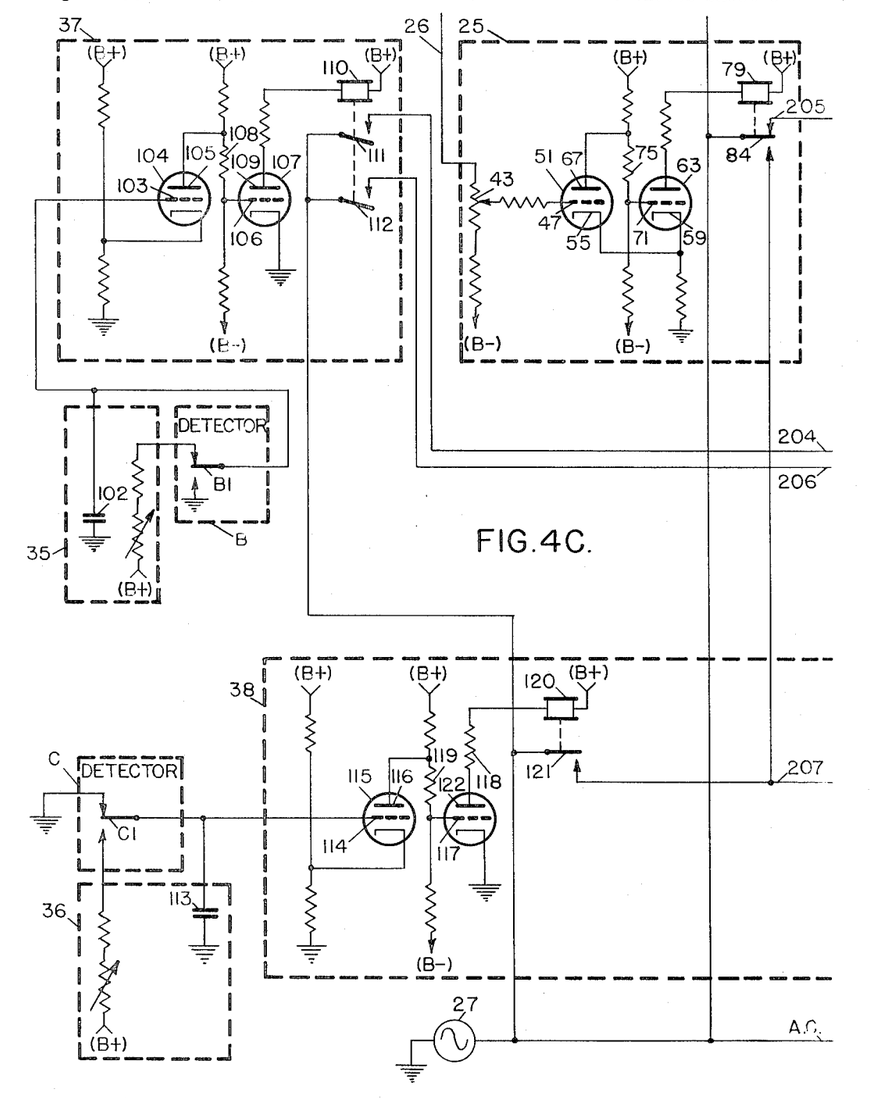

Referring next to FIGS. 4A, 4B, 4C and 4D for a more detailed description of the embodiment illustrated in FIG. 2, in FIG. 4A a relay contact A1 of detector A is shown connected through an RC integrator circuit 20 to the input of a cathode follower amplifier 21. Output of the cathode follower is applied through wire 26 to four parallel-connected potentiometers 40, 41, 42 and 43 (FIG. 4C). Output of each potentiometer of FIG. 4A is connected to the control grid 44, 45 and 46 of a vacuum tube 48, 49 and 50 respectively, while the cathode 52, 53 and 54 of each tube is connected to the cathode 56, 57 and 58 respectively, of a second vacuum tube 60, 61 and 62. Each plate 64, 65 and 66 is connected to the grid 68, 69 and 70 of tube 60, 61 and 62 respectively, through a resistor 72, 73 and 74 respectively. A relay 76, 77 and 78 is connected in the plate circuit of each tube 60, 61 and 62 respectively. Contacts 80 and 81 are associated with relay 76 and 77 respectively, while front and back contacts 82 are associated with relay 78.

Referring next to FIG. 4B, switch contacts 28, 33, 30, 31 and 32 of dial unit 29 are shown operated by keys driven by dials 90, 91, 92, 93 and 94. These dials, located in the dial unit, are driven from an A.C. powered motor 95. The relay contact 81 (FIG. 4A) controls activation of switch contact 30 through wire 201. Relay front contact 82 (FIG. 4A) controls activation of switch contact 31 through wire 202.

The signal cam unit 34 comprises at least six six-position rotary switches 96, 97, 98, 99, 100 and 101, driven from a coil 123 which cocks the cam unit upon energization and actuates the rotary switches upon deenergization. Contact 28 activates switch 96, contact 33 activates switch 97, and contacts 30, 31 and 32 activate switch 98. It should be noted that with the switches of signal cam unit 34 in the G or G' position, signal 10 provides a green signal; with the switches in the Y or Y' position, signal 10 provides a yellow signal; and with the switches in the R or R' position, signal 10 provides a red signal.

Referring next to FIG. 4C, output of potentiometer 43 is shown connected to the control grid 47 of a vacuum tube 51, while the cathode 55 is connected to the cathode 59 of a second vacuum tube 63. Plate 67 is connected to the grid 71 of tube 63 through a resistor 75. A relay 79 is connected in the plate circuit of tube 63, having front and back contacts 84. Front contact 84 controls activation of switch contact 32 (FIG. 4B) through a contact 86 of a relay 89 (shown in FIG. 4D). Contact 86 is connected to front contact 84 through a wire 205 and to contact 32 of FIG. 4B through a wire 204.

Detector B relay contact B1 completes the circuit of an RC integrator 35. Output of the integrator is taken from capacitor 102 and applied to the grid 103 of a vacuum tube 104. The plate 105 of tube 104 is connected to the grid 106 of a vacuum tube 107 through a resistor 108. The plate 109 of tube 107 is coupled to a relay 110 having a pair of contacts 111 and 112. Contact 111 serves to activate switch contact 32 (FIG. 4B) and relay contact 86 (FIG. 4D) through a wire 204. Contact 112 serves to activate relay contact 87 associated with relay 89 (FIG. 4D) through a wire 206, and to activate relay back contact 82 (FIG. 4A) through a wire 203. Thus, when no vehicle is detected by detector B, capacitor 102 charges up towards a maximum value equal to the B+ voltage amplitude. This causes tube 104 to conduct heavily, lowering grid voltage on tube 107 to the point where it cuts off, deenergizing relay 110. Upon detection of a vehicle by detector B, the detector contact B1 is grounded, immediately discharging capacitor 102 and grounding grid 103, thereby raising grid voltage on tube 107 to the point where it conducts and energizes relay 110. Relay contact 111 then applies A.C. voltage to switch contact 32 (FIG. 4B) through wire 204.

Figure 4D:
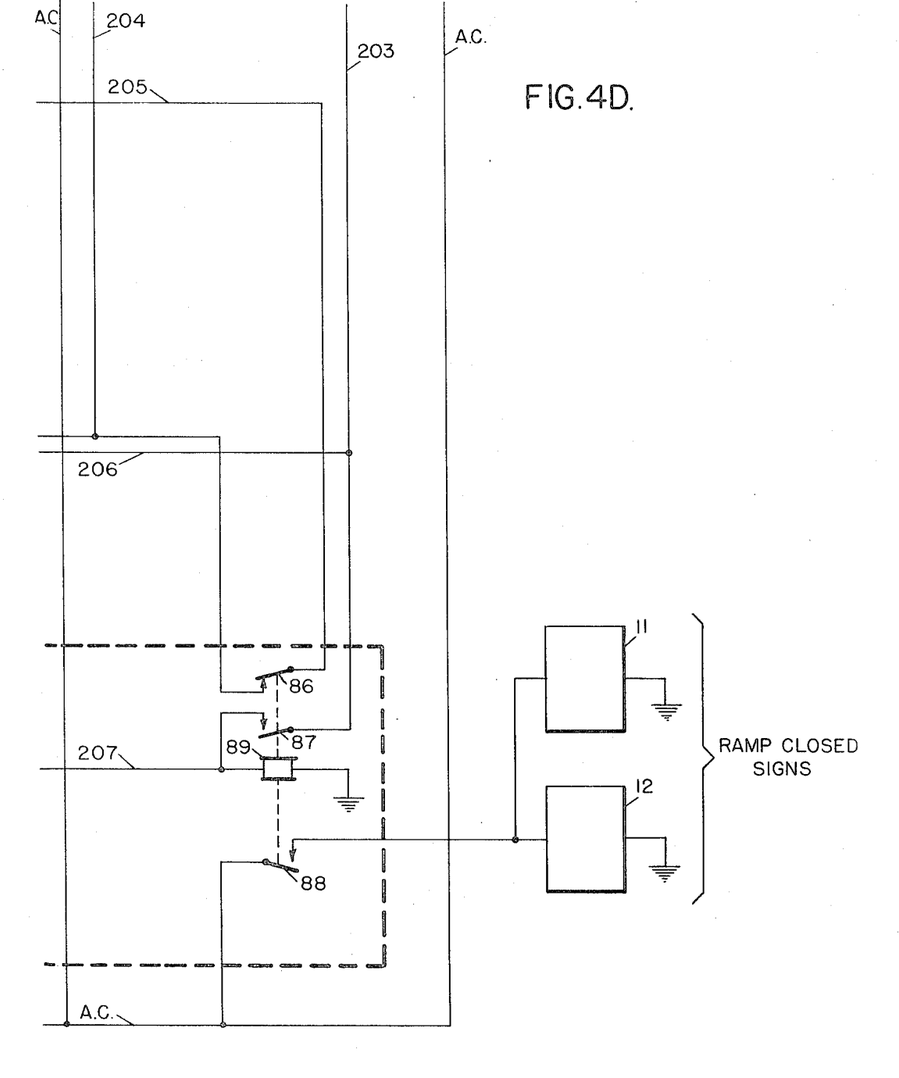

Detector C, upon actuation, completes an RC integrator circuit 36 through relay contact C1, permitting capacitor 113 to charge. The voltage on capacitor 113 is applied to the grid 114 of a vacuum tube 115. The plate 116 of tube 115 is connected to the grid 117 of a tube 118 through a resistor 119. A relay 120 having a contact 121 is coupled to the plate 122 of tube 118. Thus, when a vehicle is detected by detector C, capacitor 113 becomes part of an integrating circuit and voltage across the capacitor builds up towards the amplitude of the B+ voltage. This increases conduction of tube 115, lowering voltage on grid 117 to the point where relay 120 deenergizes. Contact 121 then closes, energizing relay 89 (FIG. 4D) through wire 207. Contact 88 of relay 89 then closes, applying A.C. power to signs 11 and 12 (FIG. 4D). It should be noted that if the vehicle detected by detector C leaves the field of detector C before capacitor 113 has charged to a voltage large enough to deenergize relay 120, detector contact C1 will immediately discharge capacitor 113, preventing relay 120 from deenergizing.

FIG. 4D shows interconnection of relay 89, having a stock circuit through its contact 87, with signs 11 and 12.

Referring now to the overall circuit of FIG. 4, when integrated output voltage amplitude of detector A is small, relays 76, 77, 78 and 79 are normally energized. To deenergize relay 76, a signal of increasing amplitude must be applied to grid 44 of tube 48. This lowers plate voltage on tube 48, thereby lowering grid voltage on tube 60. If grid voltage of tube 60 is lowered sufficiently, plate current of tube 60 will decrease to a value below that required to maintain energization of relay 76. The relay will then deenergize. In like manner, deenergization of relays 77, 78 and 79 can be achieved by an increasing voltage applied to grids 45, 46 and 47 respectively. Amplitude of grid voltage required to deenergize relays 76, 77, 78 and 79 is controlled by adjustment of potentiometers 40, 41, 42 and 43 respectively, which adjust grid bias on tubes 48, 49, 50 and 51, respectively.

Turning now to a detailed description of operation of the circuit of FIG. 4, assume that no vehicles are detected by any of the detectors. Thus, the condition of all relays is as shown in FIG. 4. Again, assume relays 76, 77, 78 and 79 are adjusted to become deenergized when lane occupancy as sensed by detector A exceeds 15%, 20%, 25% and 30% respectively. When lane occupancy is below 15%, relays 76, 77, 78 and 79 are energized, the circuit to switch contact 28 is open, and the circuits to switch contacts 30 and 31 are closed. The circuit to switch contact 32 may also be closed. Thus, if signal 10 is in the red phase, dials 92, 93, or perhaps 94 will be effective to energize coil 123. Energization of the coil cocks the cam unit, and when a dial key passes the activated dial unit switch contact, deenergizing the cam unit, switches 96, 97, 98, 99, 100 and 101 are moved to the signal green phase. When in the green phase, only switch contact 28 can energize the cam unit, and since relay 76 is energized, the cam unit will remain continuously at green until lane occupancy exceeds 15%.

When lane occupancy is between 15 and 20%, relay 76 is deenergized as previously explained, and the cam unit is driven to yellow when contact 28 momentarily closes, by the key of dial 90, three seconds before dial time zero (assuming a 60 second dial). In the yellow condition, the circuit to zero percent dial contact 33 is designed so that at time zero (three seconds after initiation of the yellow condition), the cam unit is driven to the red position. The circuit to contacts 30, 31 and 32 is then established, and since relay 77 remains energized, the key of dial 92 is effective to momentarily close contact 30 and drive the cam unit back to the green position after 15 seconds of red. The signal remains green for 42 seconds at which time dial 90 drives it again to yellow and the cycle repeats.

If lane occupancy is between 20 and 25%, relays 76 and 77 are both deenergized, as previously explained. Thus, dial 92 is ineffective, and the signal remains red for thirty seconds of each cycle. The red phase is terminated by the 50% dial 93. When lane occupancy rises to the 25–30% range, relays 76, 77 and 78 are deenergized, as previously explained, and termination of the red phase is achieved by the 75% dial 94, thus providing 45 seconds of red.

However, if relay 89 is energized, energizing signs 11 and 12 and closing the ramp entrance, dial 94 is ineffective and signal 10 remains red unless relay 110 is energized. Relay 110 is energized immediately when a vehicle is detected by detector B, as previously explained, and remains energized until a minimum gap between vehicles, determined by the charging time of capacitor 102, is obtained. For purposes of explanation, assume relay 110 will not deenergize until a 10 second gap between vehicles is detected by detector B. Thus, as long as any traffic is waiting on the ramp to enter the freeway, relay 110 will be energized, assuring at least 12 seconds of green during each 60 second cycle.

As long as 12 seconds of green is sufficient to prevent traffic from filling the ramp up to detector C, relay 89 will remain deenergized and signal 10 will operate with 45 seconds of red when freeway lane occupancy is between 25 and 30%. When freeway lane occupancy exceeds 30%, relay 79 will be deenergized, as previously explained, energizing relay 89 through relay back contact 84 and illuminating signs 11 and 12 thereby closing the ramp entrance. The signal will now go to steady red as soon as the ramp is empty, as explained in the preceding paragraph. Relay 89 will then remain energized until freeway lane occupancy falls below 25%, thereby preventing rapid on and off operations of signs 11 and 12. This feature is achieved as a result of a stick circuit which maintains energization of relay 89 through its contact 87 and back contact 82 of relay 78.

Relay 120 will deenergize whenever detector C remains energized for a specified length of time, determined by the charging time of capacitor 113, as previously explained. Assume this time to be 10 seconds for purposes of examplification. Thus, whenever traffic on the ramp backs up and causes a vehicle to stop within the field of detector C for 10 seconds or more, relay 120 deenergizes, energizing relay 89, thereby closing the ramp entrance. Before the ramp entrance may reopen, relay 110 must deenergize, indicating that the ramp has emptied and is ready to accept vehicles from the surface street. Lane occupancy must also fall below 25% before the ramp is opened, thereby assuring reasonable opportunity for ramp vehicles to merge with freeway traffic.

Figure 5:
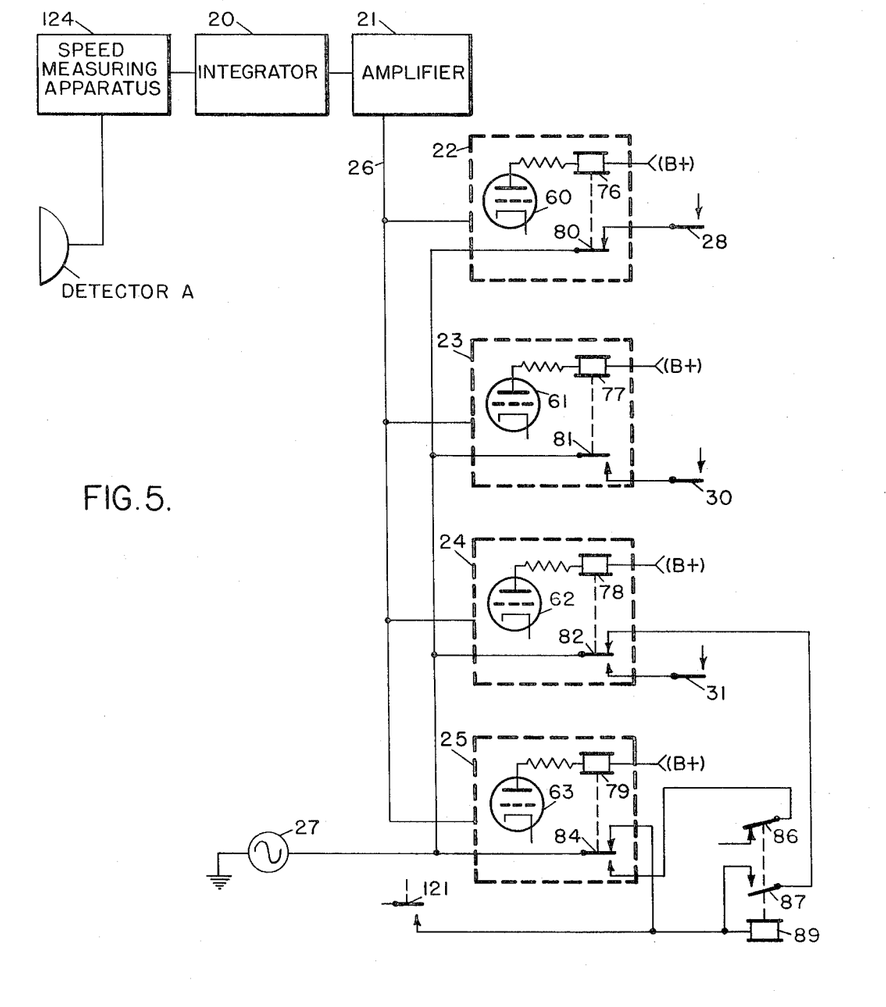
FIG. 5 is a circuit diagram of a portion of another typical embodiment of the present invention.

In the foregoing discussion, it has been assumed that operation of the ramp signal and signs has been controlled by lane occupancy measured at a point on the freeway to which the ramp feeds. It is also possible and might be desirable to use freeway speed measured at the same point, as the controlling factor. In such event, the analog voltage supplied at wire 26 in the circuit would be replaced by an analog of speed, and front and back contacts on relays 76, 77, 78 and 79 would be interchanged, as illustrated in FIG. 5. The speed analog could be obtained from a speed detector such as a sonic Doppler detector or sonic vehicle classification detector A. Thus, as seen in FIG. 5, when a moving vehicle in a predetermined lane is detected by detector A, which in this case may be a sonic or other type detector, a voltage of amplitude proportional to speed of the detected vehicle is produced. This speed signal is stored in speed measuring apparatus 124 until passage of the detected vehicle. When a second vehicle is detected in the same lane, speed of the second vehicle is ascertained and the corresponding speed signal replaces that stored for the preceding vehicle. The preceding stored signal is then applied to the integrator circuit 20, so that integrator output amplitude approximates average vehicle speed. Thus, as freeway speed increases, input amplitude to switching circuits 22, 23, 24 and 25 will increase. In the embodiment of FIG. 5 these switching circuits are adjusted so that with increasing input amplitude, relay 79 will deenergize first, followed by relay 78, followed by relay 77, and finally followed by relay 76. As speeds decrease and relay 76 energizes, signal 10 will change from steady green to 25% red during each dial unit cycle. As the speed signal decreases further in amplitude, relay 77 will energize. Signal 10 will now be red through 50% of each dial unit cycle. As the speed signal decreases further in amplitude, relay 78 will energize, closing front contact 82, thereby deactivating switch contact 31. Signal 10 will now be in the red phase for 75% of each dial unit cycle. As the speed signal decreases further, relay 79 will energize, opening its back contact 84. Under these conditions, signal 10 will be steady red as previously explained. Functioning of the "Ramp Closed" signs 11 and 12 will be similar to that described in conjunction with FIG. 3.

Figure 6:
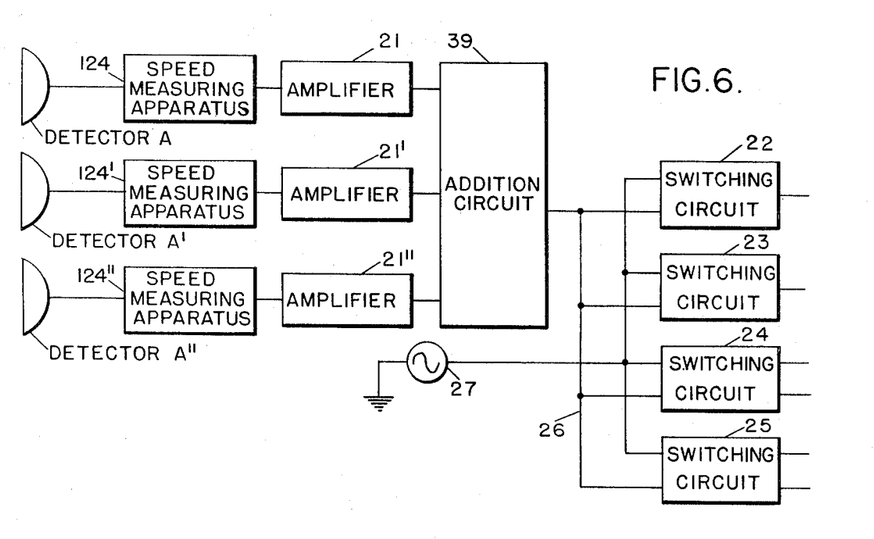
FIG. 6 is a modification of the embodiment of FIG. 5.

FIG. 6 illustrates a modification of the circuit of FIG. 2, wherein speed is sensed in each freeway lane. In this case, the freeway is assumed to have three lanes. Output of each speed detector A, A' and A" is applied to speed measuring apparatus 124, 124' and 124" respectively. Amplitudes of signals produced by the speed measuring apparatus are amplified in amplifiers 21, 21' and 21" respectively and then totaled in addition circuit 39. The composite signal produced by addition circuit 39 is applied to wire 26 of the circuit. Thus the signal controlling switching circuits 22, 23, 24 and 25 is dependent upon speeds of all freeway lanes, and is thereby more closely representative of total freeway traffic conditions. Operation of the remainder of the circuit is as described for FIG. 5.

Another possibility of the system is that control of the ramp be based on lane occupancy or speed measured at some other point on the freeway, either upstream or downstream from the region of the ramp. A further possibility is that the analog applied to wire 26 might be the output of a computer operating on a formula taking into account measurements made at several locations on the freeway and other ramps, or at other ramps alone. Such computer might also take into account variables other than those based on traffic measurements, such as temperature, and road surface condition.

Traffic parameters other than lane occupancy and speed can also be applied to ramp control. For example, regularity of vehicle spacing can be used as an indicator of congestion or potential impending breakdown of the traffic stream. Consider time durations of a number of gaps between successive vehicles in a traffic stream. In light traffic there is no reason why successive gap times should bear any relation to each other. Each driver is not influenced in his behavior by other drivers, and if he wishes to travel faster than the speed of the preceding vehicle, he has enough opportunity to change lanes and pass. As traffic becomes heavier, however, opportunity to change lanes decreases. In addition, more of each lane is occupied so that large gaps between platoons of vehicles tend to decrease in size and frequency. Eventually, under increasing traffic conditions, lane changing becomes severely limited and each lane becomes well occupied. During these conditions, each driver is greatly affected by the preceding vehicle. Speed falls to a level below that at which most drivers would prefer to travel. Therefore, each driver catches up to the vehicle in front of him and drives so as to provide sufficient gap between his car and the preceding car to allow for an emergency stop if necessary. During this condition, length and time duration of gaps between successive vehicles are nearly identical; individual particles of the traffic stream can be described as being tightly coupled to each other, since performance of each is influenced by the others.

Thus, a relation exists between level of traffic and regularity of gap time intervals or gap lengths. If traffic is light and loosely coupled, gaps vary over a wide range and are random. If traffic is heavy and tightly coupled, gaps are more uniform and regular. A further point to consider is that regularity of gaps are functions of driver behavior. Thus, on icy pavement drivers leave larger gaps which become regular at relatively low traffic volume. At such time, the road is not capable of handling high traffic volume and breakdown of the traffic stream will occur at relatively low volume. A freeway with dry pavement, capable of handling high volume before breakdown, will not display gap regularity until a higher volume level is reached, since drivers will not be influenced as greatly by preceding vehicles until they follow them more closely. Thus, the indication, when successive gaps become regular, is not that volume, lane occupancy or speed has reached a specific level, but that traffic has reached a level at which individual drivers are aware of preceding vehicles and are being influenced by behavior of the preceding vehicles. Indications are that drivers are becoming cautious and that slight further increase in traffic level might cause significant decrease in speed. Furthermore, brake application by one vehicle in the stream will have great effect on following vehicles and might well precipitate breakdown of the stream. This potential breakdown is a function of regularity of gaps rather than absolute level of gaps, since gap regularity occurs with larger gaps on icy pavement than on dry pavement and on narrow lanes than on wide lanes. Thus, an analog of gap regularity applied to wire 26 in the circuit of FIG. 4 will provide excellent ramp control. Gap regularity may also be applicable to a system for control of freeway speed signs aimed at maintenance of high freeway productivity and prevention of breakdown.

Figure 7:
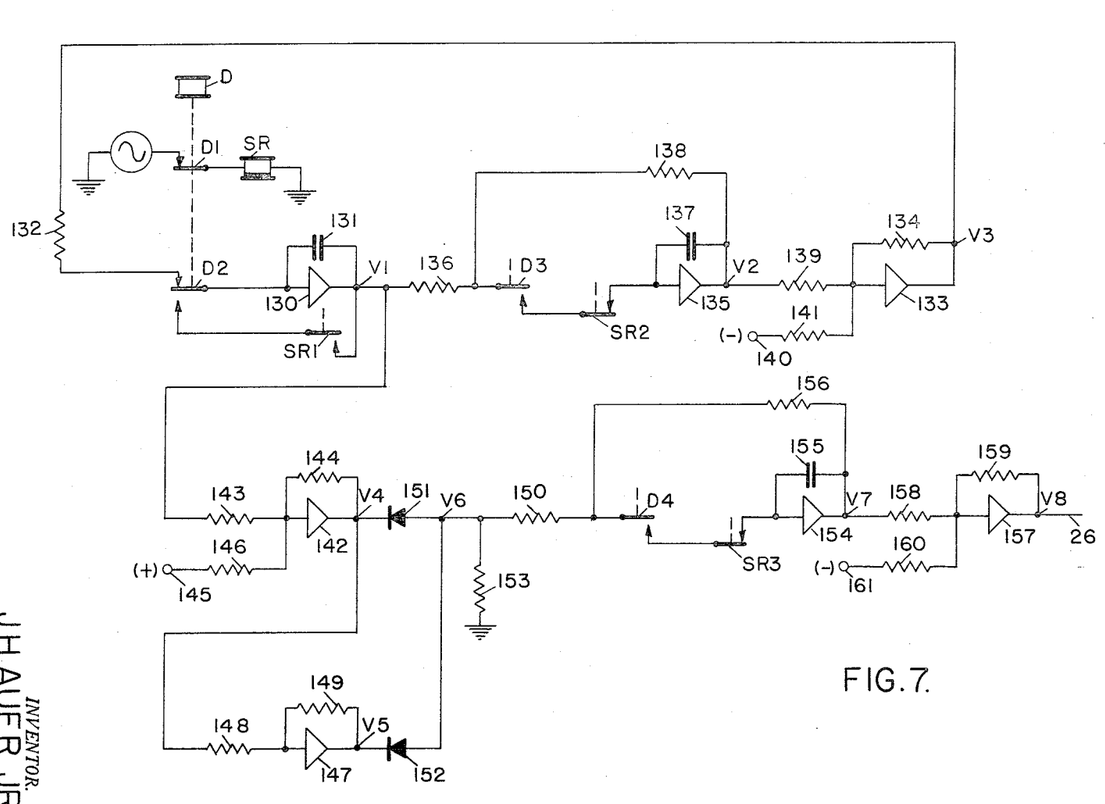
FIG. 7 is a schematic diagram of a computer for providing an output signal bearing a proportional relationship to the regularity of gaps between vehicles on a freeway.

FIG. 7 shows a circuit for computing gap regularity, the output of which is supplied to switching circuits 22, 23, 24 and 25 of FIGS. 4A and 4C through wire 26 as described, supra. In this figure, relay SR represents a slow release repeater of a vehicle presence detector relay D, receiving energization through a contact D1 of the detector relay. An amplifier 130 is connected as an integrator by having a feedback capacitor 131 coupling the output and input of amplifier 130. A resistor 132 provides a signal path from the output of an amplifier 133, connected as a summer by having feedback resistor 134 coupling the output and input of amplifier 133, to the input of amplifier 130 through a second contact D2 of the detector relay D. The circuit is shown in the condition when no vehicle is detected by detector D. During the time a vehicle passes the detector, detector relay D and relay SR both are denergized and capacitor 131 is discharged through a short circuit comprising contacts D2, and contacts SR1 of relay SR. When the vehicle leaves the detector field (that is, when the gap begins), the detector relay energizes and integration begins. Voltage on capacitor 131 increases linearly with time at a rate determined by the sizes of capacitor 131 and resistor 132, and the output voltage amplitude of amplifier 133. When the following vehicle arrives (that is, when the gap ends), the detector relay deenergizes, ending integration. Relay SR, which energized when the detector relay energized, remains in the energized or picked-up position for a short time interval after the detector relay deenergizes, due to its slow-release characteristic. During the interval in which relay D is deenergized and relay SR is in the picked-up position, output voltage of amplitfier 130 is an analog of the preceding gap time. During this brief interval, the gap analog is applied to an amplifier 135 through the series connection of a resistor 136, a contact D3 of the detector relay, and a contact SR2 of relay SR.

A feedback capacitor 137 couples the output and input of amplifier 135, and a resistor 138 couples the output of amplifier 135 to a junction betwen resistor 136 and contacts D3 of the detector relay. A resistor 139 couples the output of amplifier 135 to the input of amplifier 133. During the interval in which the detector relay is deenergized and relay SR is in the picked-up position, amplifier 135 has an RC feedback circuit, thus operating as an averaging amplifier. During this interval, output voltage amplitude of amplifier 135 moves gradually towards the output voltage amplitude of amplifier 130. Due to the long time constant of resistor 138 and capacitor 137, output voltage amplitude of amplifier 135 changes only a small during the interval when the detector relay is energized and relay SR deenergized. Thus, output of amplifier 135 is substantially an average of a large number of gap analogs provided by amplifier 130. Amplifier 133 compares this average of preceding gap analogs with a fixed D.C. voltage applied to junction betwen resistor 139 and the input of amplifier 133 from a terminal 140 through a resistor 141, and provides an amplified difference of the two voltages at its output. Output of amplifier 133 is then used as a basis for integration by amplifier 130 as previously explained. The net result is that average of gap analogs provided at the output of amplifier 130 is always held to an approximately constant D.C. voltage level regardless of the absolute analog voltage level of gap time of any one gap.

A point of interest then, is how much the individual gaps vary above and below the fixed level which an average of a large number of gaps always provides. For example, using appropriate circuit parameters, the average of gap analogs provided at the output of amplifier 130 can always be held to approximately 10 volts. Thus, under a random gap situation, ten gaps might appear at the output of amplifier 130 as follows:

| | |
|---|---|
| 1 volt | 11 volts |
| 3 volts | 13 volts |
| 5 volts | 15 volts |
| 7 volts | 17 volts |
| 9 volts | 19 volts |

Under a regular gap situation, they might be:

| | |
|---|---|
| 8 volts | 10 volts |
| 8 volts | 11 volts |
| 9 volts | 11 volts |
| 9 volts | 12 volts |
| 10 volts | 12 volts |

Output of amplifier 130 is coupled to the input of an amplifier 142 through a resistor 143. A feedback resistor 144 couples the output of amplifier 142 to the input. A terminal 145 is used for connecting a positive D.C. voltage to the input of amplifier 142 through a resistor 146. Output of amplifier 142 is coupled to the input of an amplifier 147 through a resistor 148. A resistor 149 couples the output of amplifier 147 to the input. Output of amplifier 142 is connected to a resistor 150 through a unidirectionally conducting device such as a diode 151. Output of amplifier 147 is connected to resistor 150 through a unidirectionally conducting device such as a diode 152. Polarity of diodes 151 and 152 is such that the cathodes of each diode is connected to the output of the amplifier associated with that diode, while the anodes of the diodes are connected to resistor 150. The diode anodes are returned to ground through a resistor 153.

Amplifier 142 subtracts the output of amplifier 130 from a fixed voltage applied at terminal 145 which when supplied through resistor 146, is comparable in magnitude to the average voltage on the output of amplifier 130. Amplifier 147 inverts the remainder. Diodes 151 and 152 select the negative remainder from amplifier 142 or 147. During the slow-release interval of relay SR, when this remainder represents deviation of the preceding gap from the average gap, the remainder is applied to a slow-averaging amplifier 154, similar to amplifier 135, through detector relay contact D4 and SR relay contact SR3. A feedback capacitor 155 couples the output of amplifier 154 to the input, and a resistor 156 couples the output of amplifier 154 to a point common to resistor 150 and contact D4 in order to provide amplifier 154 with a slow-averaging characteristic. Output of amplifier 154, which is an average of deviations of individual gaps from the average gap, is then coupled to an amplifier 157 through a resistor 158. Output of amplifier 157 is coupled to the input through a feedback resistor 159. A negative D.C. voltage is applied to the input of amplifier 157 from a terminal 161 through a resistor 160. If appropriate values of components and voltages are used in the circuits associated with amplifiers 142, 147, 154 and 157, output of amplifier 157 can be made zero volts for very random gaps and 100 volts for completely regular gaps. For gaps which are neither completely regular nor completely random, output voltage of amplifier 157 will lie between zero and 100 volts, increasing towards 100 volts as gaps become more regular and decreasing towards zero volts as gaps become more random.

Examining the circuit of FIG. 7 mathematically and letting:

V1=output voltage of amplifier 130,
V2=output voltage of amplifier 135,
V3=output voltage of amplifier 133,
V4=output voltage of amplifier 142,
V5=output voltage of amplifier 147,
V6=anode voltage of diodes 151 and 152,
V7=output voltage of amplifier 154,
V8=output voltage of amplifier 157,
G=length of time of gaps,
$R_1$=ohmic value of resistor 139,
$10R_1$=ohmic value of resistor 141,
$100R_1$=ohmic value of resistor 134,
$R_2$=ohmic value of resistors 136 and 138,
$R_3$=ohmic value of resistors 143, 144, 148 and 149,
$10R_3$=ohmic value of resistor 146,
$R_4$=ohmic value of resistors 150 and 156,
$R_5$=ohmic value of resistor 158,
$10R_5$=ohmic value of resistors 159 and 160.

Therefore:

$$V1_1 = -V3 \times G_1 \quad (1)$$

where $V1_1$ is the analog of gap 1. Similarly:

$$V1_2 = -V3 \times G_2 \quad (2)$$

and so on until $$V1_n = -V3 \times G_n \quad (3)$$

Output of amplifier 135 is represented by:

$$V2 = -\frac{V1_1 + V1_2 + \ldots V1_n}{n} \quad (4)$$

and by substitution:

$$V2 = V3 \frac{G_1 + G_2 + \ldots + G_n}{n} \quad (5)$$

Output of amplifier 133 with −100 volts at terminal 140, is represented by:

$$V3 = -\frac{100R_1}{R_1}(V2) - \frac{100R_1}{10R_1}(-100) \quad (6)$$
$$= 1000 - 100\,V2$$

Substituting (6) in (5) and solving for V2, it is seen that $$V2 = \frac{1000\frac{G_1+G_2+\ldots+G_n}{n}}{1+100\frac{G_1+G_2+\ldots+G_n}{n}} \quad (7)$$

Since the average value of G is unlikely to fall below one second, Equation 7 may be simplified to:

$$V2 = \frac{1000\frac{G_1+G_2+\ldots+G_n}{n}}{100\frac{G_1+G_2+\ldots+G_n}{n}} = 10 \quad (8)$$

Thus, it is apparent that the average value of gap analogs produced at the output of amplifier 130 is held approximately equal to 10 volts.

Substituting (5) in (6) it is seen that $$V3 = \frac{1000}{1+100\frac{G_1+G_2+\ldots+G_n}{n}} \quad (9)$$

Simplifying as before, assuming the average value of G to be larger than one second:

$$V3 = \frac{10}{(G_1+G_2+\ldots+G_n)/n} \quad (10)$$

Thus, V3 varies inversely as the average value of gap G. This is why the average gap analog at the output of amplifier 130 holds constant at 10 volts.

Looking now at each individual gap analog produced by amplifier 130, and substituting (10) in (3):

$$V1_n = -10\frac{G_n}{(G_1+G_2+\ldots+G_n)/n} \quad (11)$$

Applying +100 volts at terminal 145, amplifiers 142 and 147 produce the following:

$$V4_n = +\frac{R_3}{R_3}V1_n - \frac{R_3}{10R_3}100 = -V1_n - 10 \quad (12)$$

$$V5_n = -\frac{R_3}{R_3}V4_n = V1_n + 10 \quad (13)$$

Substituting (11) in (12) and (13):

$$V4_n = 10\frac{G_n - (G_1+G_2+\ldots+G_n)/n}{(G_1+G_2+\ldots+G_n)/n} \quad (14)$$

$$V5_n = 10\frac{(G_1+G_2+\ldots+G_n)/n - G_n}{(G_1+G_2+\ldots+G_n)/n} \quad (15)$$

Thus, for each gap, if the individual gap is larger than the average gap V5, will be negative; if the individual gap is less than the average gap, V4 will be negative. Diodes 151 and 152 connect amplifiers 142 and 147 to amplifier 154 so that whichever is negative, V4 or V5, is applied to amplifier 154 during the slow release time of relay SR. In this way, the absolute value of the difference independent of sign is obtained. Thus:

$$V6_n = -10\frac{G_n - (G_1+G_2+\ldots+G_n)/n}{(G_1+G_2+\ldots+G_n)/n}$$

Amplifier 154 samples individual gap deviations from the average gap and produces an average value of deviation. When the gaps are completely regular (that is, all gaps equal) individual deviations are all zero and V7 becomes zero. At this time, assuming −100 volts applied to terminal 161, V8 becomes +100 volts. When the gaps are completely random, V7 reaches +10 volts and V8 becomes zero volts. Thus, V8 increases as regularity of gaps increases. As V8 increases, restriction of the ramp should be increased.

From the foregoing description, it can be seen that the invention provides a freeway access ramp traffic control system wherein the timing cycle for a traffic signal is automatically selected in accordance with traffic conditions. The system can restrict entry onto a freeway from an access ramp in accordance with freeway lane occupancy or speed, or in accordance with regularity of spacing between vehicles on the freeway. The system will also automatically limit entry to a freeway access ramp when the ramp becomes filled with vehicles waiting to enter the freeway and when freeway traffic is heavy.

Having described a freeway access ramp traffic control as one specific embodiment of the present invention, it is desired to be understood that this form is selected to facilitate in the disclosure of the invention rather than to limit the number of forms which it may assume; and it is to be further understood that various modifications, adaptations, and alterations may be applied to the specific form shown to meet the requirements of practice, without in any manner departing from the spirit or scope of the present invention.

What I claim is:

1. In an access control system for a freeway having an entrance ramp and a traffic signal controlling vehicular entry from the ramp onto the freeway, a first vehicle presence detector situated to sense freeway lane occupancy, a second vehicle presence detector situated to sense ramp outlet occupancy, a third vehicle presence detector situated to sense ramp inlet occupancy, and means connecting the detectors to the traffic signal for controlling duration of red signal and green signal in accordance with traffic conditions sensed by the vehicle presence detectors.

2. In an access control system for a freeway having an entrance ramp, a cyclically operated traffic signal controlling vehicular entry from the ramp onto the freeway, and signalling means for preventing traffic from entering the ramp, a first vehicle presence detector situated to sense freeway lane occupancy, a second vehicle presence detector situated to sense ramp outlet occupancy, a third vehicle presence detector situated to sense ramp inlet occupancy, first switching means coupling the detectors to the traffic signal for selecting different predetermined proportions of red signal and green signal to each signal cycle in accordance with traffic conditions sensed by the vehicle presence detectors and second switching means coupling the first and third detectors to the signalling means for preventing traffic from entering the entrance ramp during heavy traffic conditions.

3. In an access control system for a freeway having an entrance ramp and a traffic signal controlling vehicular entry from the ramp onto the freeway, a first vehicle presence detector situated to sense vehicles on a freeway lane, second and third vehicle presence detectors situated to sense ramp occupancy and producing output voltages dependent upon ramp occupancy, means responsive to the output of the first vehicle presence detector providing an output voltage bearing a relationship to regularity of gaps between vehicles on the freeway, and switching means applying said output voltages to the traffic signal for varying the proportion of red phase to green phase in accordance with traffic conditions sensed by the vehicle presence detectors.

4. In an access control system for a freeway having an entrance ramp and a traffic signal controlling vehicular entry from the ramp onto the freeway, a first vehicle presence detector situated to sense freeway lane occupancy, a second vehicle presence detector situated to sense ramp outlet occupancy, a third vehicle presence detector situated to sense ramp inlet occupancy, and circuit means automatically selecting one of a plurality of timing cycles of the traffic signal, each cycle having different stop and go signalling intervals from all other cycles, in accordance with traffic conditions sensed by the vehicle presence detectors.

5. In an access control system for a freeway having an entrance ramp, a traffic signal controlling vehicular entry from the ramp onto the freeway, and signalling means for preventing traffic from entering the ramp, a vehicle speed detector situated to sense vehicular speed on a freeway lane, a vehicle presence detector situated to sense ramp outlet occupancy, a vehicle presence detector situated to sense ramp inlet occupancy, first switching means coupling the detectors to the traffic signal for selecting different predetermined proportions of red signal to green signal in accordance with traffic conditions sensed by the detectors and second switching means coupling the speed detector and the vehicle presence detector sensing ramp inlet occupancy to the signalling means for preventing traffic from entering the entrance ramp during heavy traffic conditions.

6. In an access control system for a freeway having an entrance ramp and a traffic signal controlling vehicular entry from the ramp onto the freeway; first vehicle presence detecting means situated to sense lane occupancy of at least one freeway lane; second vehicle presence detecting means situated to sense ramp outlet occupancy; third vehicle presence detecting means situated to sense ramp inlet occupancy; first, second and third integrator means responsive to said first, second and third detecting means respectively; and amplitude responsive switching means coupling the integrator means to the traffic signal for discretely controlling durations of red and green signals in accordance with the combination of vehicle amplitudes produced by the integrator means.

7. A traffic parameter computer for providing a voltage analog of traffic congestion based upon uniformity of spacing between vehicles travelling on a roadway, comprising a vehicle presence detector sensing successive vehicles in a stream of traffic, said detector producing an output signal during each interval occurring between completion of detection of a vehicle and initiation of detection of the next successive vehicle, electrical integrating means responsive to said output signals produced by the detector for providing output voltages corresponding to the time integrals of said output signals, switching means responsive to the detector for substantially instantaneously resetting said integrating means after each interval occurring between completion of detection of a vehicle and initiation of detection of the next successive vehicle, means algebraically summing a predetermined voltage with the output voltage of the integrating means, and means averaging the output voltage of the algebraic summing means to produce said voltage analog of traffic congestion on the roadway.

8. Means for controlling access to a freeway in accordance with regularity of spacing between vehicles on the freeway comprising, means sensing successive vehicles travelling on a freeway lane, means responsive to the sensing means for producing a signal analog of each time interval occurring between completion of detection of a vehicle and initiation of detection of the next successive vehicle, means substantially instantaneously resetting said responsive means during each detection of a vehicle, means averaging deviations of the signal analogs from a fixed reference signal for providing an output signal of amplitude proportional to regularity of said intervals, and means selecting a timing cycle for a traffic control means in accordance with said output signal amplitude.

9. A system for controlling vehicular traffic entering an expressway from an entrance ramp comprising, a first traffic control means for regulating the flow of traffic from said ramp onto said expressway, a second traffic control means for at times prohibiting the entry of traffic onto said ramp, at least one vehicle detector for detecting vehicles travelling along said expressway, circuit means connected to said detector for producing a control parameter representative of the amount of vehicular traffic on said expressway, first means coupled to said circuit means and responsive to the value of said control parameter for controlling the proportionate amount of time over any given interval that said first traffic control means permits traffic to flow from said ramp onto said expressway, and second means coupled to said circuit means and responsive to the attainment by said control parameter of a predetermined high value representative of high traffic congestion on said expressway for controlling said second traffic control means to prohibit the entry of further vehicles onto said ramp.

10. In an access control system for a freeway having an entrance ramp and a traffic signal operating on a predetermined timing cycle for controlling vehicular entry from the ramp onto the freeway, first vehicle detecting means situated to sense traffic congestion on at least one freeway lane, means coupling said first vehicle detecting means to the traffic signal for changing the signal indication at a predetermined time in the timing cycle in accordance with said congestion, second vehicle detecting means sensing ramp traffic, and means coupling said second vehicle detecting means to the traffic signal for changing the signal indication in accordance with ramp traffic conditions.

11. In a system for controlling the flow of traffic, a controlled access highway, an entrance ramp for conducting vehicles onto said highway, a traffic signal selectively displaying stop and proceed indications for controlling the passage of vehicles from said ramp onto said highway but displaying no signal indications to vehicles on said highway, vehicle detector means responsive to vehicles travelling on said highway, first means operatively connected to said vehicle detector means for generating a signal characteristic of the level of traffic on said highway, and second means responsive to said characteristic signal for controlling said traffic signal to display continually a proceed indication to vehicles on said entrance ramp when said generated signal is less than a predetermined value and to display proceed and stop indications alternately when said generated signal is greater than said predetermined value, whereby the entry of vehicles onto said highway from said ramp is restricted only when the level of highway traffic exceeds said predetermined value to thereby maximize the volume of traffic that can flow on said highway.

12. The system of claim 11 in which said second means controls said signal to alternately display proceed and stop indications having relative durations in accordance with the magnitude of said generated signal when the level of traffic congestion is greater than said predetermined value.

13. The system of claim 12 wherein said vehicle detector means comprises a presence-type detector, and said signal generated by said signal control means has an amplitude proportional to the ratio of the cumulative vehicle detection time of said presence detector occurring throughout any given measuring interval to the total duration of such interval, said second means controlling the relative durations of the proceed and stop indications in accordance with the magnitude of said generated signal.

14. The system of claim 11 which further includes a second traffic signal for controlling the access of vehicles onto said ramp and also includes means responsive to vehicles on said ramp, said last-named means controlling said second signal to display an indication at times barring the access of further vehicles to said ramp.

15. The system of claim 11 wherein said first means generates a signal representative of the average velocity of the vehicles on said highway, said second means controlling said signal to display a proceed indication to all vehicles on said ramp and attempting to enter said highway past said signal when the average speed of vehicles on said highway exceeds a predetermined value and controlling said signal to display alternately proceed and stop indications when the average speed of vehicles on said highway is less than said predetermined value.

16. The system of claim 15 in which said vehicle detector means is located to respond to vehicles which are downstream of the junction of said ramp with said highway.

References Cited by the Examiner
UNITED STATES PATENTS 3,237,154  2/1966  Barker _______________ 340—38

NEIL C. READ, *Primary Examiner.*

THOMAS B. HABECKER, *Examiner.*

UNITED STATES PATENT OFFICE

Certificate

Patent No. 3,304,539

Patented February 14, 1967

John H. Auer, Jr.

Application having been made by John H. Auer, Jr., the inventor named in the patent above identified; and General Signal Corporation, Rochester, New York, a corporation of New York, the assignee, and William L. Parker of Lisle, Illinois for the issuance of a certificate under the provisions of Title 35, Section 256, of the United States Code, adding the name of the said William L. Parker as a joint inventor, and a showing and proof of facts satisfying the requirements of the said section having been submitted, it is this 1st day of July 1969, certified that the name of the said William L. Parker is hereby added to the said patent as a joint inventor with the said John H. Auer, Jr.

[SEAL]

EDWIN L. REYNOLDS,
*First Assistant Commissioner.*